(12) United States Patent
Hara

(10) Patent No.: US 7,973,992 B2
(45) Date of Patent: Jul. 5, 2011

(54) IMAGING DEVICE FOR AVOIDANCE OF AN OBSTACLE OR AN OPTICAL PHENOMENON WHICH DISTORTS QUALITY OF IMAGE

(75) Inventor: Takenori Hara, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 528 days.

(21) Appl. No.: 12/081,312

(22) Filed: Apr. 14, 2008

(65) Prior Publication Data

US 2009/0257122 A1   Oct. 15, 2009

(51) Int. Cl.
   *G02B 26/02* (2006.01)
(52) U.S. Cl. .......................... 359/227; 396/471
(58) Field of Classification Search .................. 359/227, 359/230, 511; 396/448, 452, 471; 250/208.1, 250/559.05–559.08
   See application file for complete search history.

(56) References Cited

U.S. PATENT DOCUMENTS

| | | |
|---|---|---|
| 5,841,507 A | 11/1998 | Barnes |
| 2007/0212058 A1 | 9/2007 | Kawai |
| 2009/0097095 A1 * | 4/2009 | Border et al. ................ 359/254 |

FOREIGN PATENT DOCUMENTS

| | | |
|---|---|---|
| JP | 5-232566 A | 9/1993 |
| JP | 6-303471 A | 10/1994 |
| JP | 07151946 A | 6/1995 |

OTHER PUBLICATIONS

Extended European Search Report, directed to EP 09 15 7834 mailed on Sep. 11, 2009, 5 pages.

* cited by examiner

*Primary Examiner* — James Phan
(74) *Attorney, Agent, or Firm* — Smith Patent Office

(57) ABSTRACT

A method for avoiding an obstacle or an image-quality-degrading optical phenomenon in an image recognition unit is provided. The method includes the steps of providing at least an optical shutter array in the image recognition unit, detecting the obstacle or the optical phenomenon, and closing the optical shutter that corresponds to the portion affected by the obstacle or the optical phenomenon. The method can be readily implemented even when the space for implementing the method is small, for example, in a small space in a camera currently in use, and driving power consumed in the method is small. In an image affected by an obstacle attached to a lens or a protective cover for the lens in an imaging device or an optical phenomenon produced by the lens or the protective cover for the lens in the imaging device, an imaging method and image processing are used to avoid the obstacle or the optical phenomenon produced by the lens or the protective cover for the lens in the imaging device without removing the obstacle or optical phenomenon itself.

4 Claims, 14 Drawing Sheets
(14 of 14 Drawing Sheet(s) Filed in Color)

[Fig. 1]
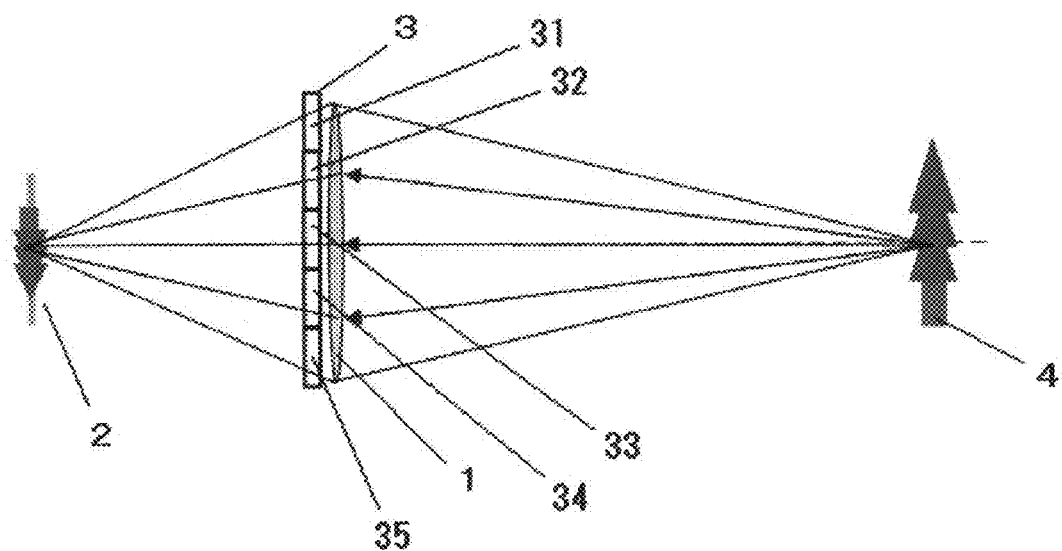
[Fig. 2]
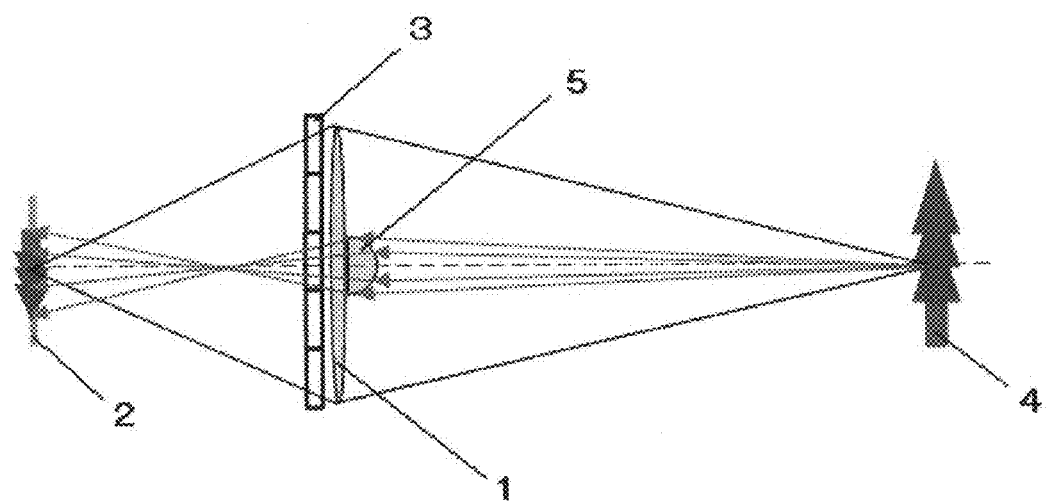

[Fig. 3]
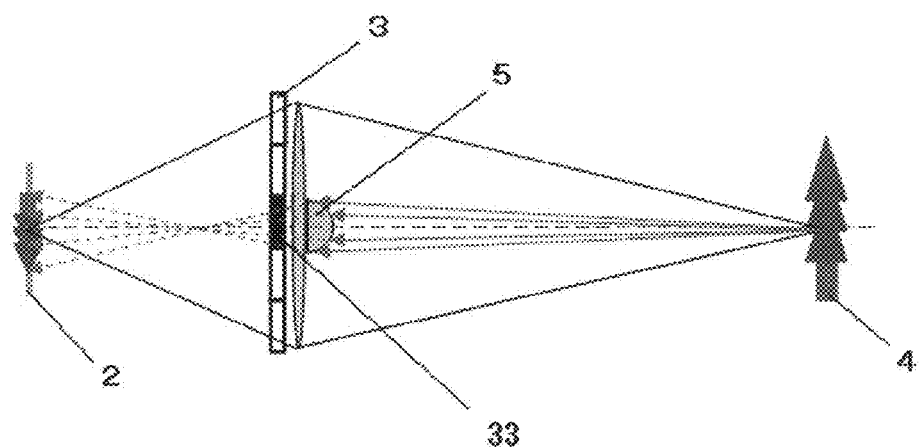
[Fig. 4]
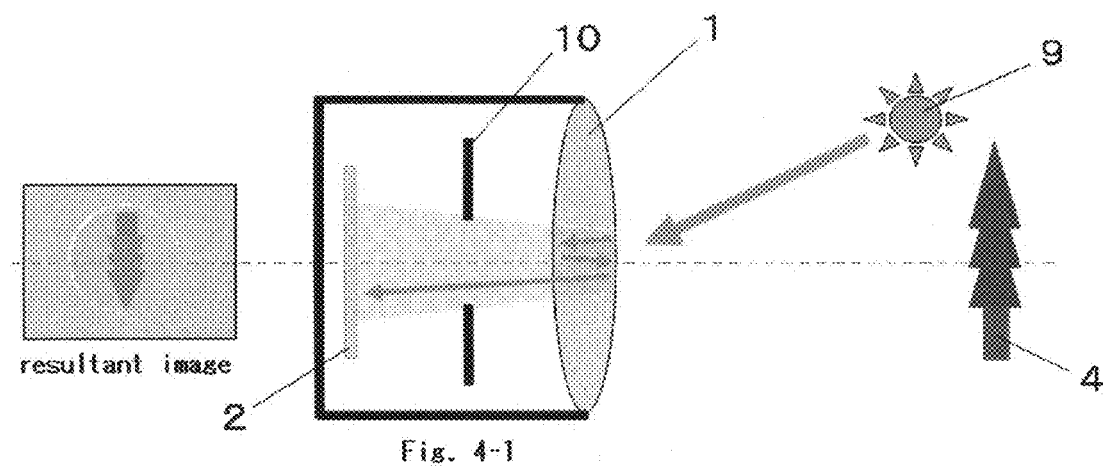
Fig. 4-1
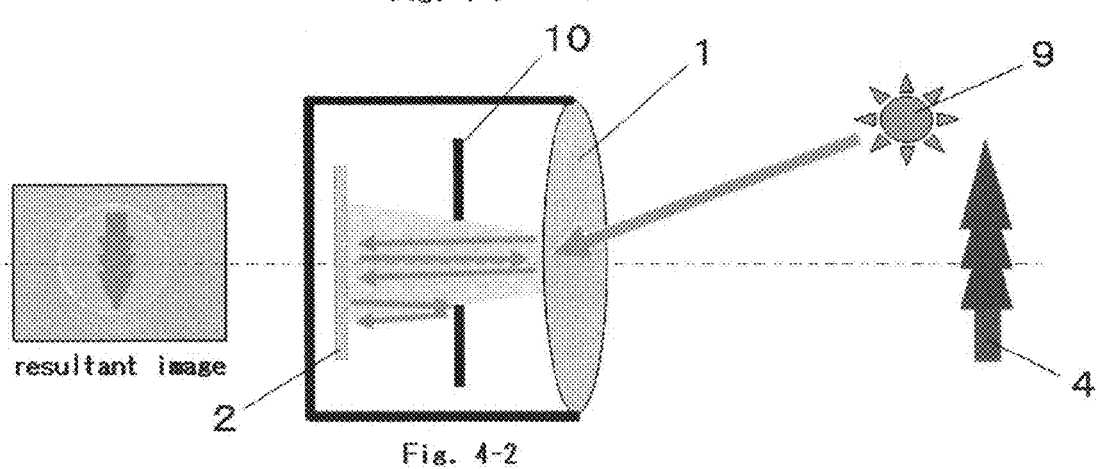
Fig. 4-2

[Fig. 5]
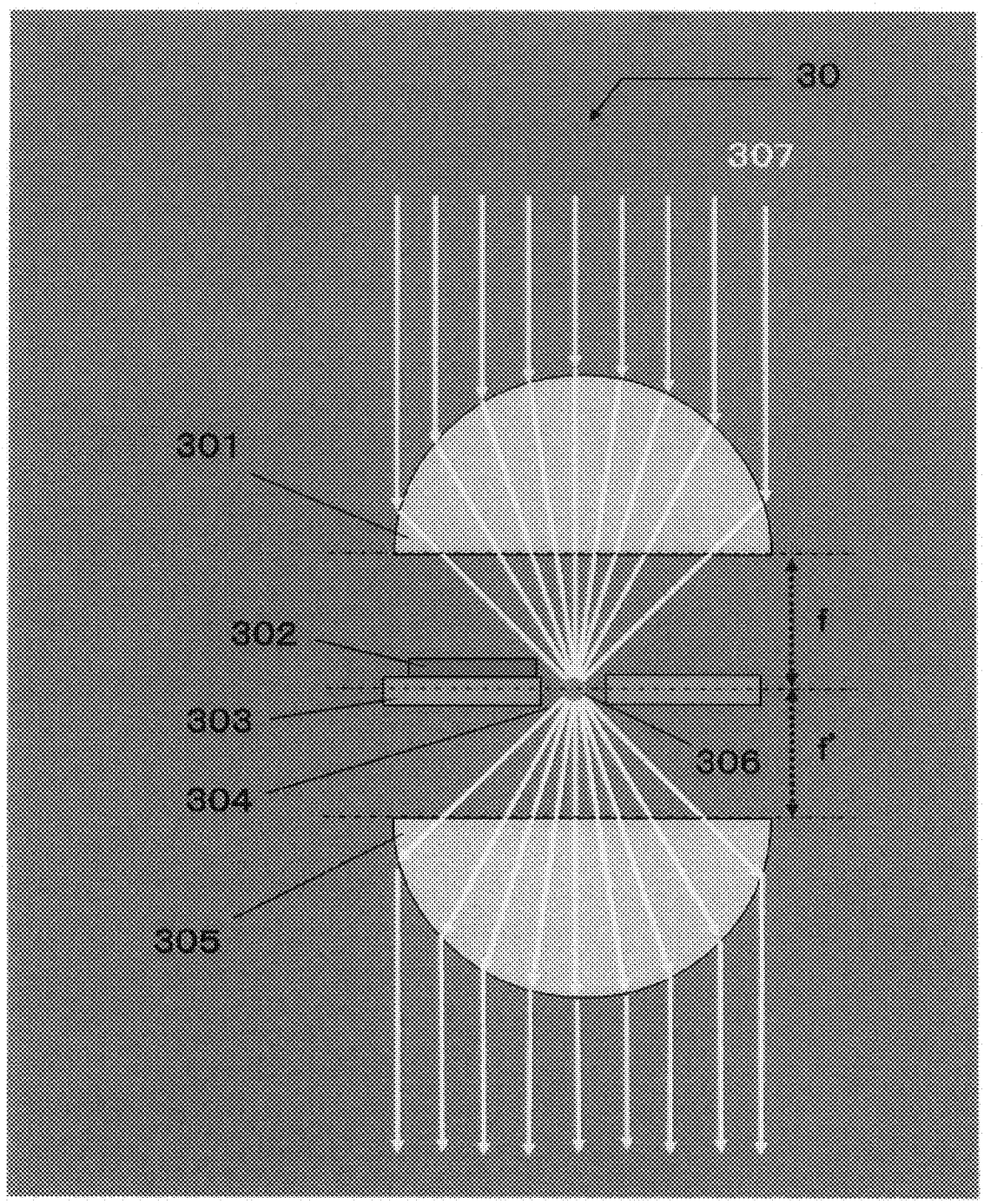

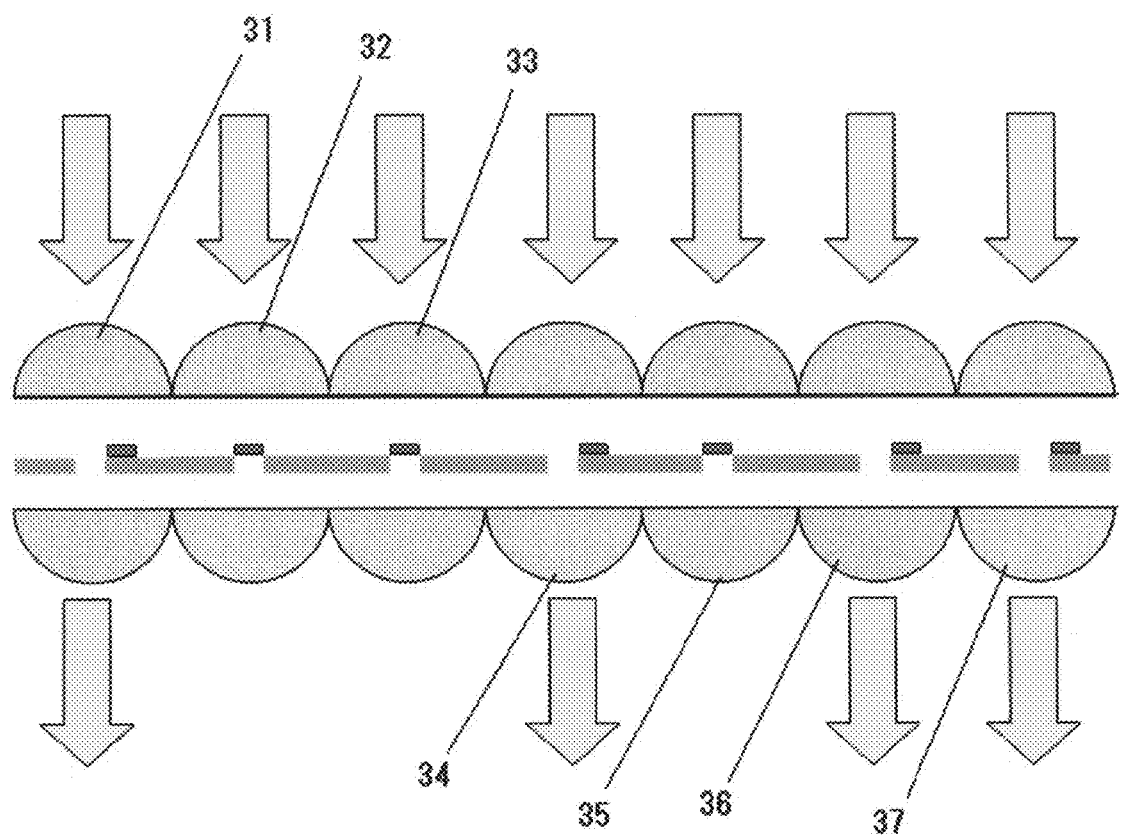
[Fig. 6]

[Fig. 7]
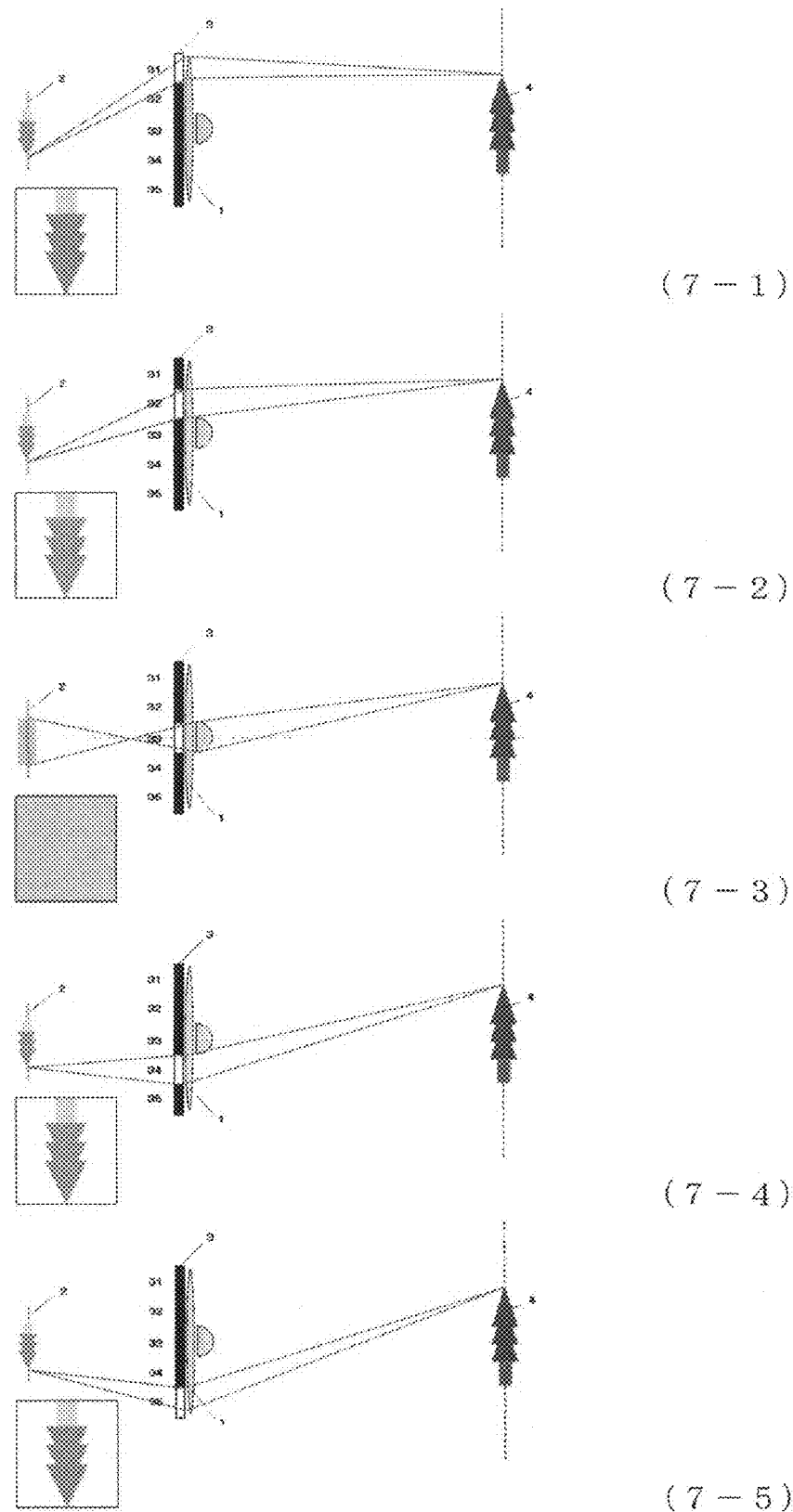
(7-1)
(7-2)
(7-3)
(7-4)
(7-5)

[Fig. 8]
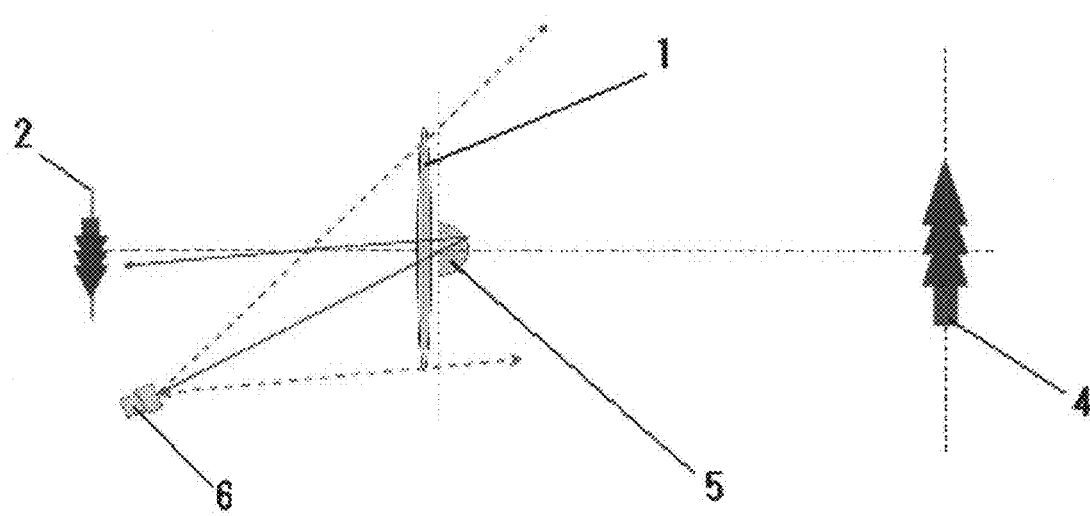

[Fig. 9]
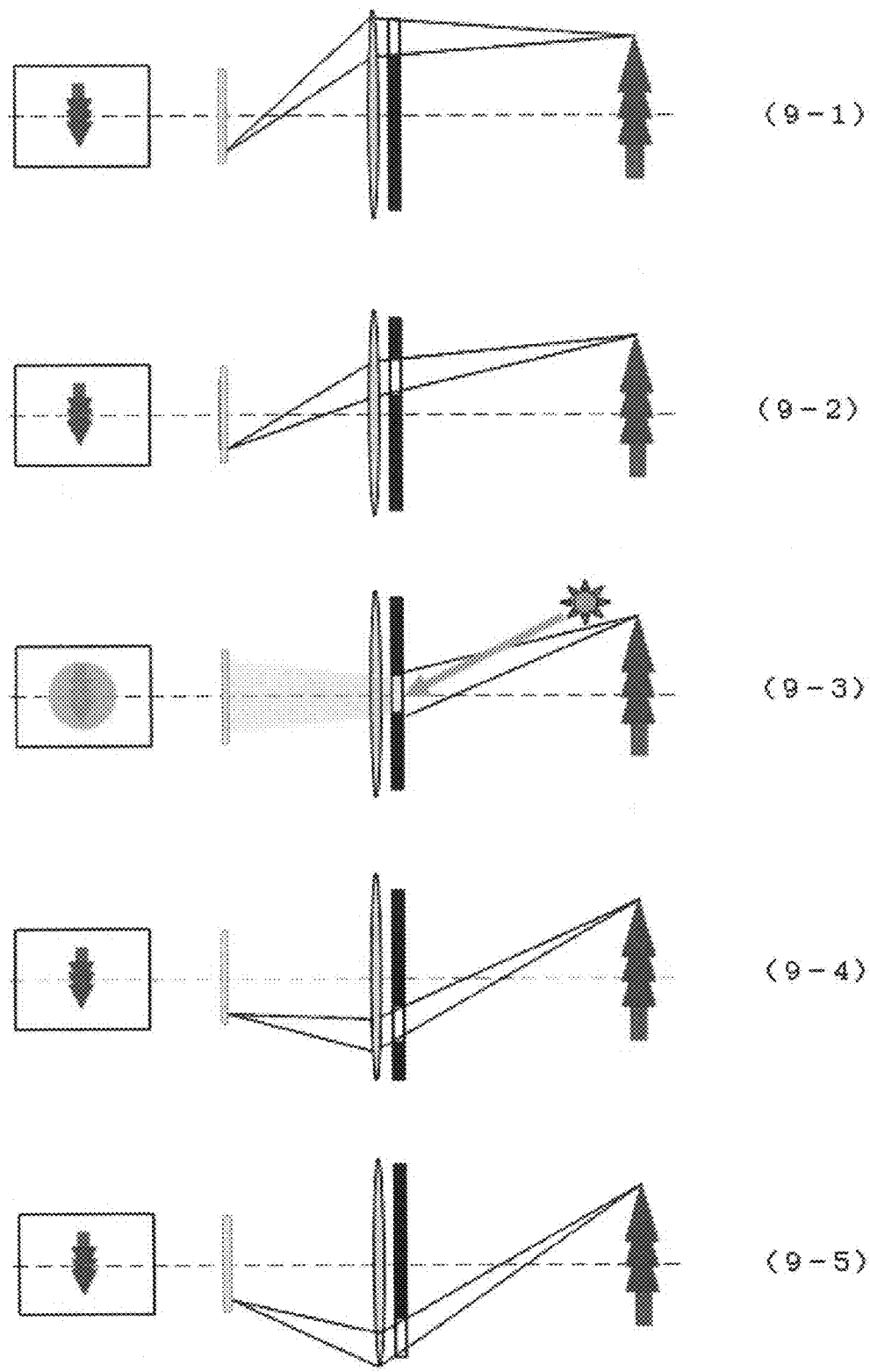
(9-1)
(9-2)
(9-3)
(9-4)
(9-5)

[Fig. 10]
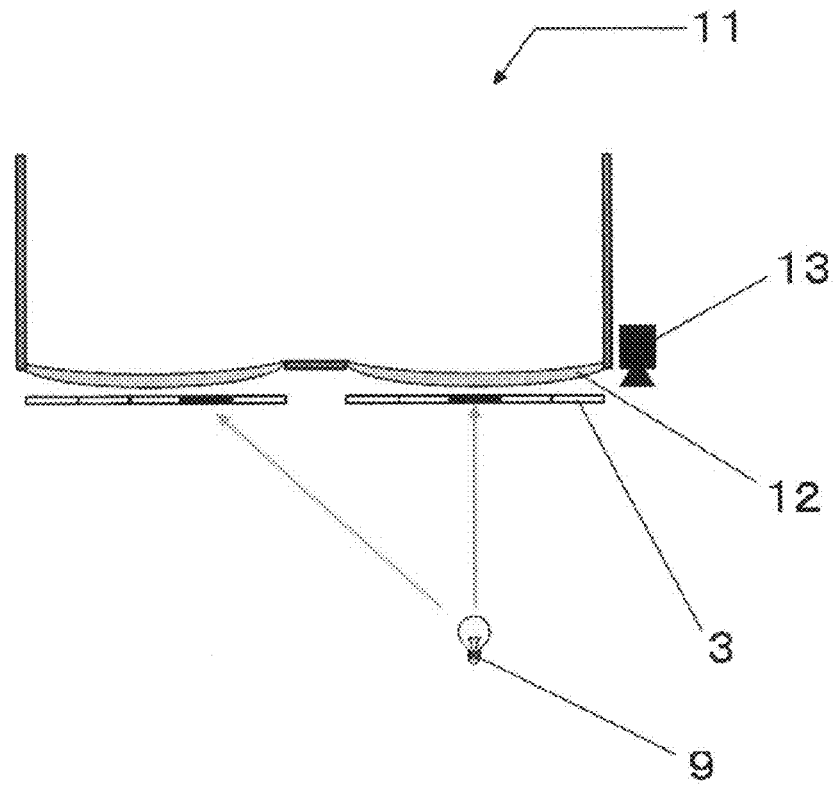
[Fig. 11]
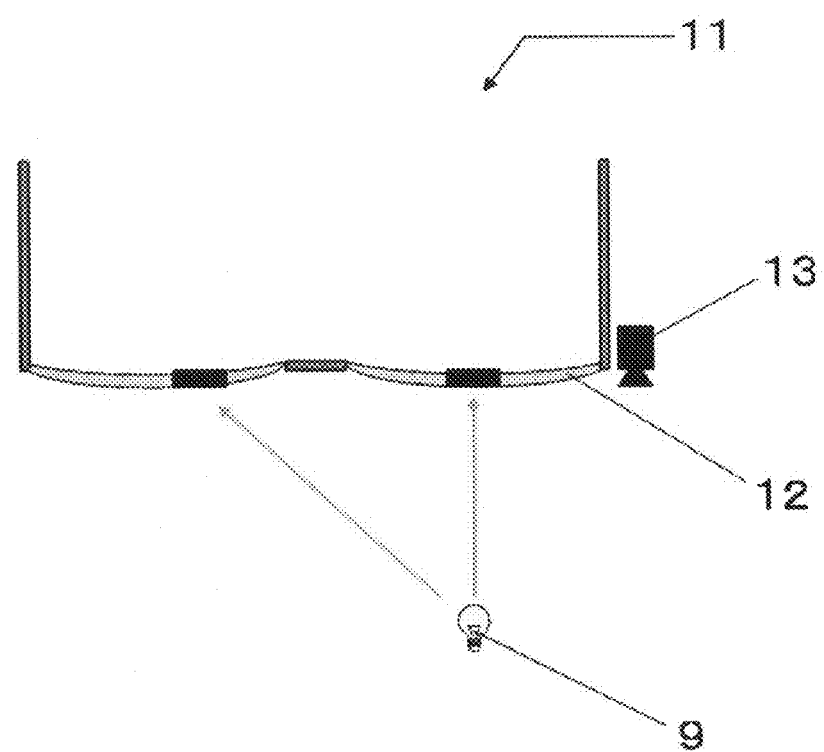

[Fig. 1 2]
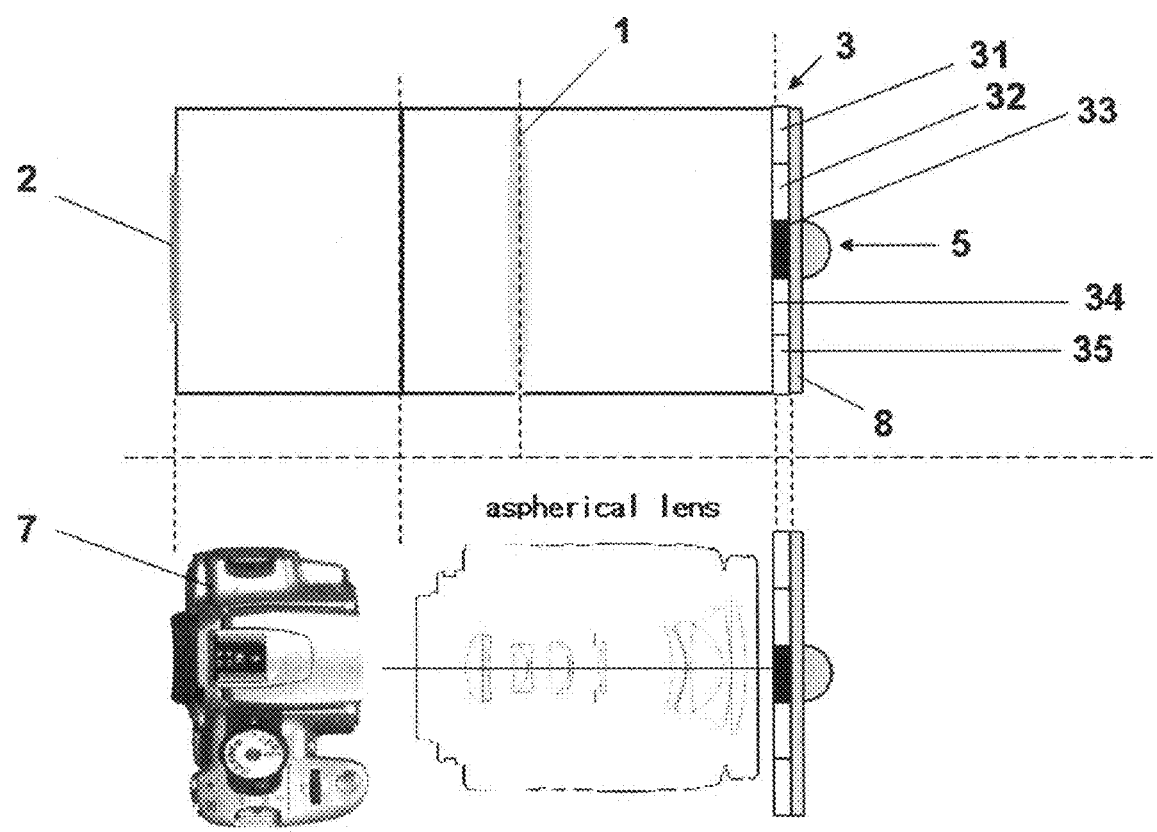

[Fig. 13]
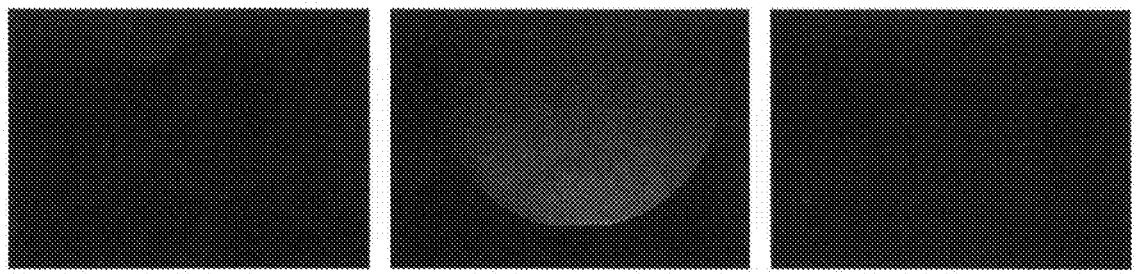
13-1          13-3          13-5
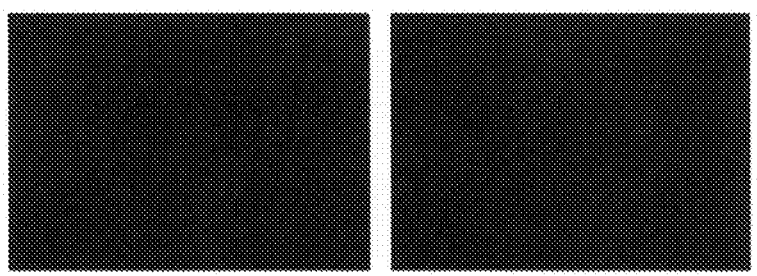
13-2          13-4
[Fig. 14]
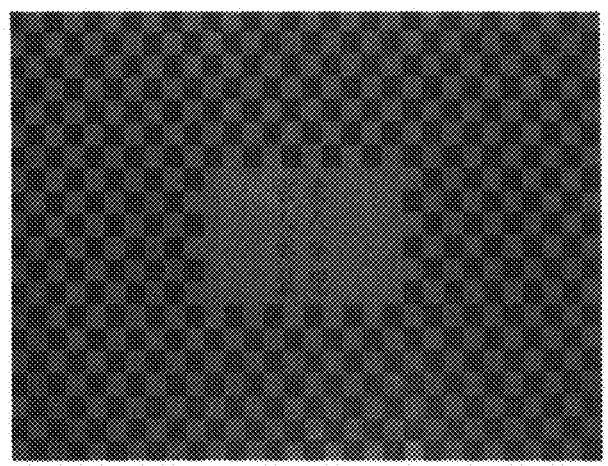

[Fig. 15]
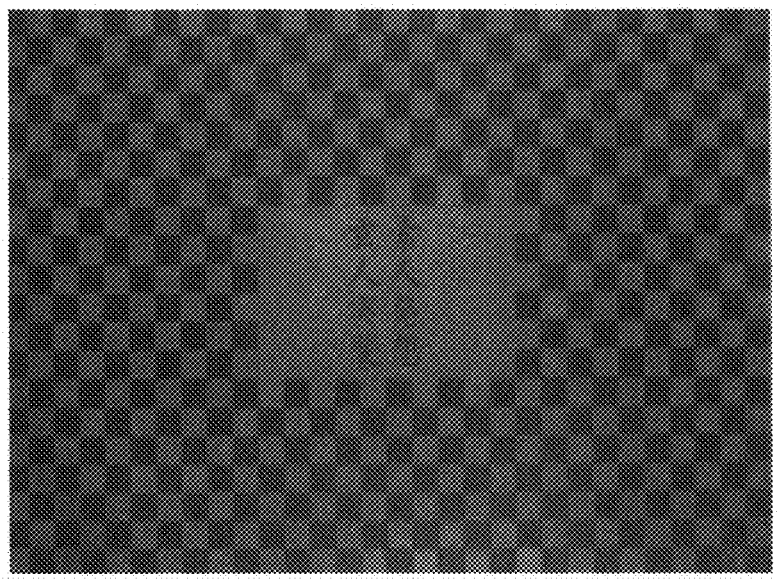
[Fig. 16]
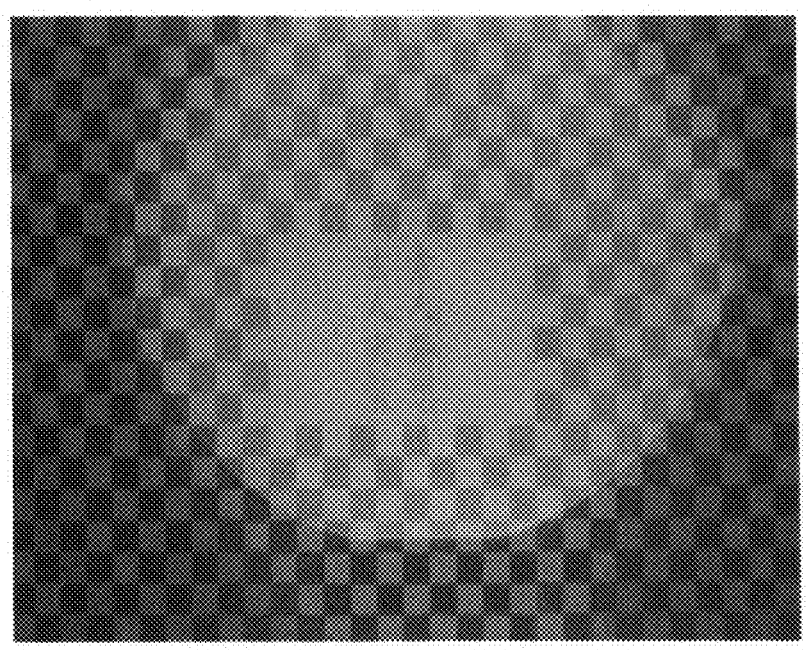

[Fig. 17]
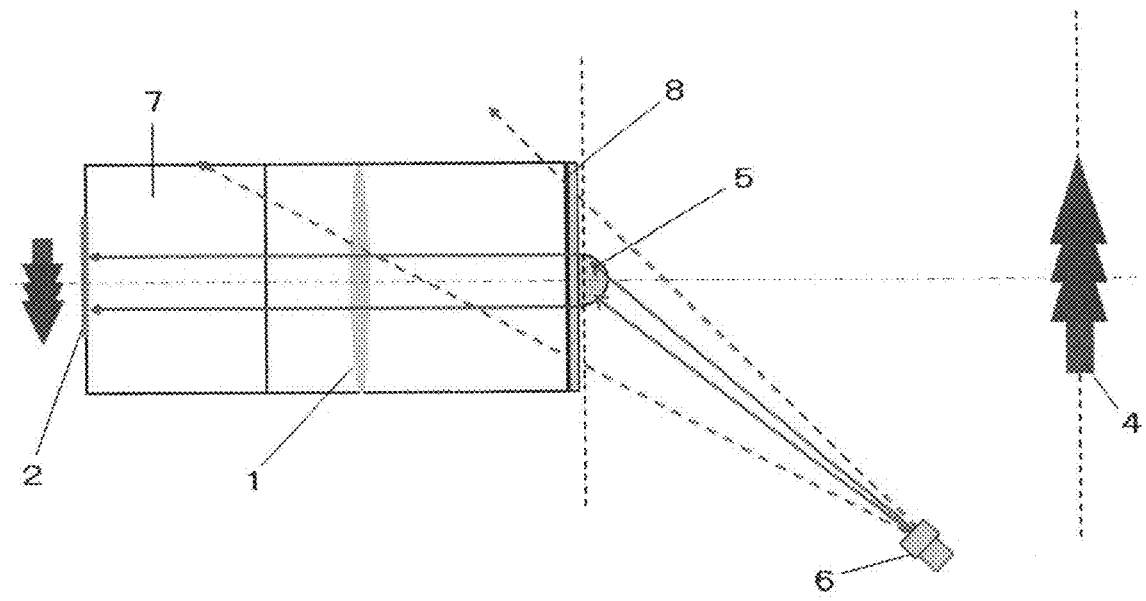

[Fig. 18]
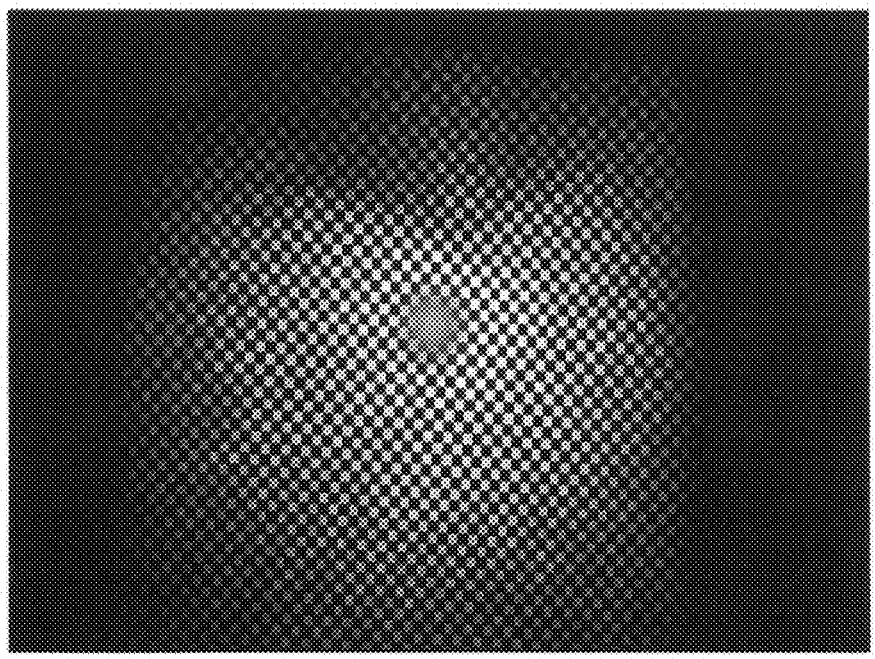
18-1
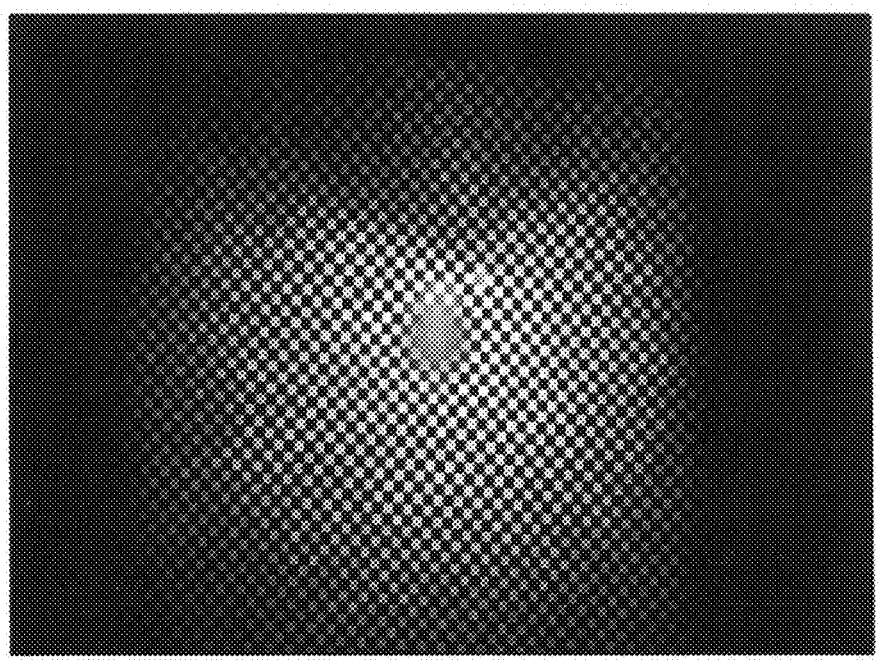
18-2

[Fig. 19]
19-1
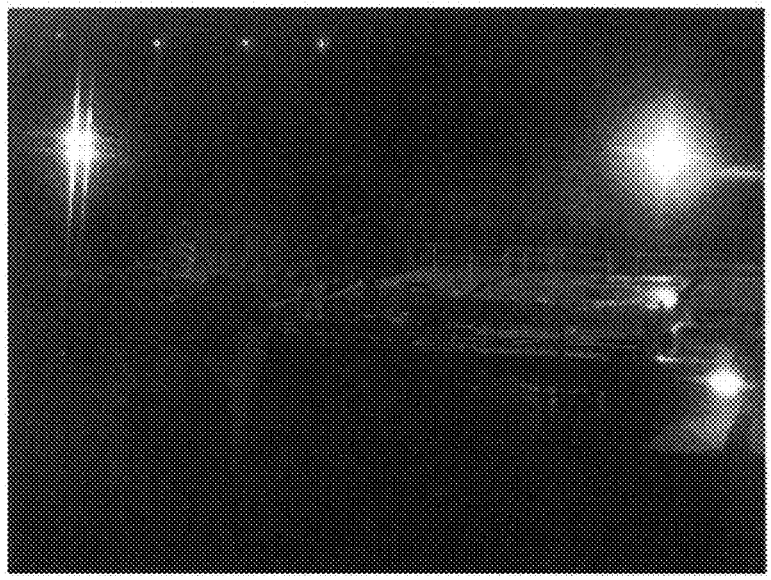
19-2

IMAGING DEVICE FOR AVOIDANCE OF AN OBSTACLE OR AN OPTICAL PHENOMENON WHICH DISTORTS QUALITY OF IMAGE

BACKGROUND OF THE INVENTION

1. Field of the Invention

The present invention relates to a method used in an image recognition unit, the method for avoiding an obstacle that prevents image recognition or an optical phenomenon that degrades image quality to provide high image quality.

2. Description of the Related Art

When a camera is used in bad weather, such as in the rain, or in a bad condition in which a large number of dusts are present, obstacles, such as water drops or dusts, may attach to a lens or a protective cover for the lens. It is important to remove such obstacles in order to provide a high-quality image, and there is a method for removing such obstacles, for example, using a wiper blade (see JP-A-6-303471). Although the method involves removing obstacles themselves and hence is effective, the fact that the wiper blade appears as another obstacle in an image renders the method unsuitable for high-quality-oriented imaging. The method causes other problems as well, including missing image information on the portion hidden behind the wiper blade and necessity to provide a mechanism for actuating the wiper and hence maintenance of the mechanism.

A method for applying a water-repellent agent or other agents onto a lens to remove water drops and dirt has been proposed (see JP-A-5-232566). In the method, however, such obstacles can be reduced in number, but cannot be removed entirely.

On the other hand, there is a method for removing obstacles, such as water drops, in a captured image by using a plurality of cameras to capture images and combining the images free from the influence of the obstacles. The method, however, requires significant equipment expense and installation space as well as a power supply and other devices for driving such an apparatus.

There is also a method for combining portions free of water drops or other obstacles by using a camera that can pan and tilt in horizontal and vertical directions and capturing images while the camera pans and tilts. However, as in the method described above, the method requires significant equipment expense and installation space as well as a power supply and other devices for driving such an apparatus. Further, the method cannot disadvantageously provide the resultant image free from influence of obstacles in real-time.

When an object to be imaged contains a high-intensity light source, an optical phenomenon called glare occurs. Glare is a phenomenon in which an object becomes less visible by a light source, and occurs in observation by human eyes and a camera.

To remove glare, one can wear sunglasses, polarized glasses, or anti-glare filters or use an expensive low-glare lens. These devices can reduce the influence of glare, but not sufficiently. There is still a need for further improvement.

SUMMARY OF THE INVENTION

An object of the present invention is to solve the above problems and provide a method for avoiding an obstacle that prevents image recognition and an optical phenomenon that degrades image quality in an image recognition unit by using an image recognition method and an image processing method without removing the obstacle and the optical phenomenon so as to provide high image quality.

The present inventor has intensively conducted studies to achieve the above object and found that the problems can be solved by inserting an optical shutter array in an image recognition unit and closing the optical shutter that corresponds to the portion affected by an obstacle or an optical phenomenon. The present invention has been accomplished based on such findings.

That is, the present invention provides:

(1) A method for avoiding an obstacle or an image-quality-degrading optical phenomenon in an image recognition unit, the method comprising the steps of: providing at least an optical shutter array in the image recognition unit; detecting the obstacle or the optical phenomenon; and closing the optical shutter that corresponds to the portion affected by the obstacle or the optical phenomenon.

(2) The method for avoiding an obstacle or an image-quality-degrading optical phenomenon according to (1), wherein the image recognition unit is an imaging device; the imaging device includes a lens, an imaging element, and a protective cover that protects the lens; and an obstacle attached to the lens or the protective cover or an image-quality-degrading optical phenomenon that occurs at the lens or the protective cover is detected.

(3) The method for avoiding an obstacle or an image-quality-degrading optical phenomenon according to (2), wherein the detection of the obstacle or the optical phenomenon is carried out by sequentially opening the optical shutters in the optical shutter array to capture images and comparing the resultant multiple images with one another.

(4) The method for avoiding an obstacle or an image-quality-degrading optical phenomenon according to (2), wherein the lens or the protective cover is irradiated with light and the resultant reflected light is used to detect the obstacle or the image-quality-degrading optical phenomenon.

(5) The method for avoiding an obstacle or an image-quality-degrading optical phenomenon according to (1), wherein the image recognition unit is human eyes with the aid of glasses or sunglasses, and glasses or sunglasses include optical shutter arrays.

(6) The method for avoiding an obstacle or an image-quality-degrading optical phenomenon according to (5), wherein the glasses or sunglasses are provided with a small camera, and the small camera captures an image to detect the image-quality-degrading optical phenomenon.

According to the method of the present invention, in an image affected by an obstacle attached to a lens or a protective cover for the lens in an imaging device or an optical phenomenon produced by the lens or the protective cover for the lens in the imaging device, an imaging method and image processing can be used to avoid the obstacle or the optical phenomenon produced by the lens or the protective cover for the lens in the imaging device without removing the obstacle or optical phenomenon itself. The method can be readily implemented even when the space for implementing the method is small, for example, in a small space in a camera currently in use, and driving power consumed in the method is small. At the same time, a high-quality image can be obtained. Further, the method can be applied to glasses or sunglasses to avoid an optical phenomenon that glares on human eyes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a conceptual view of an imaging device used in the present invention;

FIG. 2 is a conceptual view showing a case where an obstacle is attached to a lens;

FIG. 3 is a conceptual view showing a case where part of optical shutters is closed;

FIGS. 4-1 and 4-2 are conceptual views showing cases where a lens is irradiated with light from a high-intensity light source;

FIG. 5 is a conceptual view showing an example of an optical shutter;

FIG. 6 is a conceptual view showing an example of an optical shutter array;

FIGS. 7-1 to 7-5 are conceptual views showing an example of a method for detecting an obstacle;

FIG. 8 is a conceptual view showing another example of a method for detecting an obstacle;

FIGS. 9-1 to 9-5 are conceptual views showing an example of a method for detecting the position of an optical phenomenon produced by a lens in an imaging device or a protective cover for the lens;

FIG. 10 is a conceptual view of glasses or sunglasses used in the present invention;

FIG. 11 is a conceptual view of glasses or sunglasses used in the present invention;

FIG. 12 is a conceptual view showing an imaging device in Example 1;

FIGS. 13-1 to 13-5 show results of obstacle detection in Example 1;

FIG. 14 shows the result obtained by imaging a subject using the method described in Example 1;

FIG. 15 shows the result obtained by imaging the subject without forming a water drop;

FIG. 16 shows the result obtained by imaging the subject using the method described in Comparative Example 1;

FIG. 17 is a conceptual view showing an obstacle detection method described in Example 2;

FIGS. 18-1 and 18-2 show results of obstacle detection in Example 2; and

FIGS. 19-1 and 19-2 show the results obtained by imaging a subject in Example 3.

DESCRIPTION OF SYMBOLS 1. lens
2. imaging element
3. optical shutter array
30, 31, 32, 33, 34, 35, 36 and 37. optical shutter
301. light collecting microlens
302. micro-shutter
303. light-blocking plate
304. light transmitting hole
305. light restoring microlens
306. focal point
307. light path
4. subject
5. obstacle
6. light source
7. body of camera
8. protective cover
9. sunlight (high-intensity light)
10. diaphragm
f, f'. focal length
x. distance from the light source to the center of the lens
θ. angle formed by a line connecting the center of a lens to an imaging element and a line connecting the center of the lens to a light source
11. glasses or sunglasses
12. outer side of glasses or sunglasses
13. small camera

DESCRIPTION OF THE PREFERRED EMBODIMENT

The present invention provides a method for avoiding an obstacle or an optical phenomenon that degrades image quality in an image recognition unit, and the image recognition unit includes at least an optical shutter array, detects the obstacle or the optical phenomenon, and closes the optical shutter that corresponds to the portion affected by the obstacle or the optical phenomenon.

In the present invention, the image recognition unit specifically corresponds to, for example, an imaging device or human eyes. The method of the present invention used with an imaging device or human eyes will be described below in detail with reference to the drawings.

FIG. 1 is a conceptual view of an imaging device used in the present invention. As shown in FIGS. 1 to 3, the imaging device according to the present invention includes a lens 1, an imaging element 2, and an optical shutter array 3. While FIGS. 1 to 3 show an aspect in which the optical shutter array 3 is positioned between the lens 1 and the imaging element 2, the present invention is not limited to the aspect. For example, the optical shutter array 3 may be positioned between the lens 1 and a subject 4. The lens 1 is adjusted so that its focal point coincides with the imaging element 2.

A protective cover (not shown) for protecting the lens may be provided outside the lens 1 (on the right side of the lens 1 in FIG. 1). Further, the optical shutter array 3 may be positioned outside the lens 1 so as to also serve as the protective cover.

An image of the subject 4 passes straight through or is refracted through the lens 1, and focused on the imaging element 2. The optical shutter array 3 is inserted between the lens 1 and the imaging element 2 and serves as a so-called shutter of a camera. In the example shown in FIG. 1, the optical shutter array 3 includes optical shutters 31 to 35, and opening and closing operations of each of the optical shutters are independently controlled. Each of the shutters transmits light when it is open, while blocking light when it is closed.

FIG. 2 is a conceptual view showing the state in which a water drop as an obstacle 5 is attached to the lens 1. In this case, the water drop scatters or otherwise affects the light, so that the image is degraded on the imaging element 2. More specifically, the light from the subject 4 is refracted through, reflected off, and diffused by the obstacle 5 and the lens 1, and then incident on a plurality of points on the imaging element 2, resulting in a degraded image.

In the present invention, the optical shutter 33 is closed in such a case as shown in FIG. 3 to prevent the image-degrading light from reaching the imaging element 2. The light fluxes that have passed through the optical shutters 31, 32, 34, and 35 are used to form an image, so that an image of the subject 4 that is free from the influence of the obstacle 5 is focused on the imaging element 2.

In the example shown in FIG. 3, the obstacle 5 affects only the light passing through the optical shutter 33. When the portion affected by the obstacle 5 overlaps a plurality of the optical shutters, the advantageous effect of the present invention can be achieved by closing the plurality of optical shutters. For example, when the obstacle 5 overlaps the optical shutters 33 and 34 and affects the light passing therethrough, the influence of the obstacle 5 can be completely removed by closing the optical shutters 33 and 34.

On the other hand, the greater the number of closed optical shutters, the darker the image on the imaging element 2. Closed optical shutters are therefore preferably small in number in consideration of the amount of light. Therefore, when the portion affected by the obstacle 5 overlaps a plurality of the optical shutters, and, for example, the obstacle 5 greatly affects the optical shutter 33 but not the optical shutter 34, the optical shutter 34 can be opened or closed in accordance with necessary image quality and a required amount of light. That is, when it is desired to reduce the influence of the obstacle 5, the optical shutter 34 as well as the optical shutter 33 are closed. On the other hand, when it is desired to place more importance on the amount of light than image quality, the optical shutter 34 is opened.

FIGS. 4-1 and 4-2 are conceptual views showing a case where the lens 1 is irradiated with light from a high-intensity light source, represented by sunlight. In this case, the optical phenomenon called glare described above occurs. That is, as shown in FIG. 4-1, sunlight or other light irregularly reflected off part of a camera lens degrades the visibility of a subject. Alternatively, as shown in FIG. 4-2, sunlight or other light passing through a diaphragm and irregularly reflected off the image sensor degrades the visibility of a subject.

The lens 1 in the imaging device used in the present invention is not limited to specific ones, and can be, for example, a lens made of optical glass and a lens made of resin, such as an acrylic resin. The shape of the lens is also not limited to specific ones. Examples of the lens 1 include a convex lens, such as a double-convex lens, a plano-convex lens, a convex-meniscus lens, and a convex aspherical lens; and a concave lens, such as a double-concave lens, a plano-concave lens, a concave-meniscus lens, and a concave aspherical lens. Any of these lenses are typically combined to form the lens 1. The refractive index is not particularly limited to specific values, but variously determined in accordance with applications. The lens 1 may be coated with a hard coating or other coatings.

Examples of the imaging element 2 used in the present invention include image sensors, such as a CCD (Charge Coupled Device) image sensor and a CMOS (Complementary Metal Oxide Semiconductor) image sensor; silver salt films used in conventional film cameras, and even human eyes when the present invention is applied to, for example, binoculars and a telescope.

The optical shutter 30 used in the present invention is not limited to specific ones, but, for example, the optical shutter shown in FIG. 5 is preferred. The optical shutter shown in FIG. 5 includes a light collecting microlens 301, a micro-shutter 302, a light-blocking plate 303, a light transmitting hole 304, and a light restoring microlens 305. That is, the micro-shutter 302 and the light-blocking plate 303 are disposed between the light collecting microlens 301 and the light restoring microlens 305, and the light transmitting hole 304 is formed in the light-blocking plate.

The light-blocking plate 303 is disposed apart from the light collecting microlens 301 by the focal length f thereof, and the light transmitting hole 304 is disposed at the position of the focal point 306 of the light collecting microlens 301. The light restoring microlens 305 is disposed apart from the light-blocking plate 303 by the focal length f' of the light restoring microlens 305.

The light collecting microlens 301 and the light restoring microlens 305 may be the same one (in terms of shape, refractive index, material, focal length, and other parameters), or may differ from each other. When the light collecting microlens 301 and the light restoring microlens 305 differ from each other, the focal lengths f and f' are adjusted so that the respective focal points 306 coincide with the light transmitting hole 304.

In the optical shutter 30, light transmitting and blocking operations are controlled by removing the micro-shutter 302, disposed in the vicinity of the light transmitting hole 304, from the light transmitting hole 304, and blocking the light transmitting hole 304 with the micro-shutter 302. A method for driving the micro-shutter 302 is not limited to specific ones, and, for example, an actuator, an electromagnet, a chemical reaction can be used. The micro-shutter 302 may be configured to laterally slide as shown in FIG. 5 or pivot by 90 degrees, or may be a mechanical diaphragm of a camera.

The optical shutter array 3 can be readily fabricated by arranging optical shutters in a plane, as shown in FIG. 6. In the example shown in FIG. 6, optical shutters 31 to 37 are arranged. In the arrangement, the optical shutters 31, 34, 36, and 37 are open and hence transmit light. In the example, the obstacle 5 affects the portion that corresponds to the optical shutters 32, 33, and 35, and the influence of the obstacle 5 can be removed from an image by closing the above optical shutters.

A liquid crystal shutter can preferably be used as the optical shutter of the present invention. The liquid crystal shutter is not limited to specific ones, but can be those typically used as optical materials. More specifically, examples of such optical materials include normally-black liquid crystal and normally-white liquid crystal. Normally-black liquid crystal has a structure in which two transparent electrode plates are disposed with a narrow gap therebetween and the two electrode plates and a liquid crystal cell encapsulated therebetween are sandwiched between two polarizer plates. The normally-black liquid crystal is opaque when no voltage is applied, while being transparent when a voltage is applied externally. Normally-white liquid crystal operates in an opposite manner. Further, the liquid crystal arrangement (TN and STN, for example) is not limited to specific ones.

The imaging device in the present invention may include a protective cover for protecting the lens. Even when obstacles, such as water drops, attach to the protective cover, a high-quality image can be obtained not by physically removing the obstacles but by avoiding them, as in the case where obstacles attach to the lens.

The protective cover is not limited to specific ones as long as it is highly transparent and has high strength. Examples of the material of the protective cover include transparent plastics, such as acrylic resin and polycarbonate resin. Further, as described above, the optical shutter, when positioned at certain locations, can also function as the protective cover.

A detailed description will be made of a unit that detects the position of the obstacle 5 or the position of the optical phenomenon produced by the lens of the imaging device or the protective cover for the lens (hereinafter simply referred to as "the position of an optical phenomenon"). As the unit that detects the position of the obstacle 5 or the optical phenomenon, for example, the following simple, straightforward methods are preferred, although a variety of units are conceivable.

A first method involves detecting the position of an obstacle or an optical phenomenon by sequentially opening and closing the optical shutters in the optical shutter array to capture images and comparing resultant multiple images with one another. The method will be specifically described with reference to a case where an obstacle is detected.

As shown in FIGS. 7-1 to 7-5, closed optical shutters 31 to 35 are sequentially opened one by one starting from the optical shutter 31, and images are captured through the respective open shutters. The resultant multiple images (five images in the example shown in FIG. 7-1 to 7-5) are compared with one another. The light from the subject 4 is refracted through, reflected off, and diffused by the obstacle 5 and the lens 1, and then incident on a plurality of points on the image sensor 2, so that the image affected by the obstacle 5 is degraded (see FIG. 7C). In the example shown in FIGS. 7-1 to 7-5, substantially the same images are obtained in FIGS. 7-1, 7-2, 7-4, and 7-5, while a different image is obtained in FIG. 7-3. It is detected therefore that the obstacle 5 is present at the position where the light passing through the optical shutter 33 is affected.

Subsequently, based on the information on the position of the obstacle, an image free from the influence of the obstacle is obtained by keeping only the optical shutter 33 closed and imaging the subject through the other optical shutters.

A second method for detecting the position of the obstacle 5 involves detecting the obstacle by irradiating the lens and/or the protective cover for the lens with intense light and measuring reflected light therefrom. The method will be described below in detail with reference to FIG. 8.

As shown in FIG. 8, the method involves irradiating the lens 1 with intense light from a light source 6 and receiving the light reflected off the lens 1 and incident on the image sensor 2. That is, the portion of the lens 1 to which no obstacle is attached transmits the light emitted from the light source 6 and hence does not affect the image sensor 2 at all, whereas only the light reflected off the obstacle 5 is detected by the image sensor 2. The position of the obstacle 5 is therefore detected by using information on the position of the light source 6, the refractive index of the lens 1, and the like.

The position of the light source 6 is not limited to specific ones, but the light source 6 is desirably positioned in such a way that the light source itself does not appear in an image and the light source does not affect an object to be imaged. The type of the light source is not limited to specific ones as long as an obstacle can be detected by using the light source. Preferable examples of the light source, however, include a high-intensity LED and a flash light for a camera characterized by high intensity and a fast light response rate from the viewpoint of, for example, detection sensitivity and power consumption.

The first method described above can be used as the unit that detects the position of an optical phenomenon. That is, the method involves sequentially opening the optical shutters in the optical shutter array to capture images, and comparing the resultant multiple images with one another to detect the position of the optical phenomenon. Specifically, as shown in FIGS. 9-1 to 9-5, for example, closed optical shutters 31 to 35 are sequentially opened one by one starting from the optical shutter 31, and images are captured through the respective open shutters. The resultant multiple images (five images in the example in FIGS. 9-1 to 9-5) are compared with one another. The light from a high-intensity light source, such as sunlight, is applied as described above, and irregularly reflected off the lens 1 or the image sensor 2, so that the image affected by the optical phenomenon is degraded (see FIG. 9-3). In the example shown in FIGS. 9-1 to 9-5, substantially the same images are obtained in FIGS. 9-1, 9-2, 9-4, and 9-5, whereas a different image is obtained in FIG. 9-3. It is therefore detected that the optical phenomenon is present at the position where the light passing through the optical shutter 33 is affected.

Subsequently, based on the information on the position of the obstacle, an image free from the influence of the optical phenomenon is obtained by keeping only the optical shutter 33 closed and imaging the subject through the other optical shutters.

The present invention also encompasses an aspect in which the image recognition unit is human eyes with the aid of glasses or sunglasses including an optical shutter array. In the case of glasses or sunglasses, an obstacle directly attached thereto is easily removed, whereas an optical phenomenon that glares on human eyes is difficult to remove. In the later case, the present invention is significantly effective. That is, in the present aspect, an image-quality-degrading optical phenomenon means sunlight and intense illumination that glares on or otherwise affects human eyes so that the wearer cannot visually identify things in front of the wearer.

Aspects of the present invention in which the present invention is applied to glasses or sunglasses will be described with reference to FIGS. 10 and 11. FIG. 10 shows a case where optical shutter arrays are provided on the outer side (the side opposite to the eyes) of glasses or sunglasses. As shown in FIG. 10, when intense light, such as sunlight, is applied, the light that glares on the eyes is blocked by detecting information on the position of the intense light and closing the optical shutter corresponding to the portion affected by the optical phenomenon.

In the present aspect, the optical shutter arrays may be disposed by fastening them with fasteners or the like to the glasses or sunglasses, or may be detachably attached thereto as required. In such an aspect, for example, when a driver drives an automobile against light and the light affects the driving, the provision of optical shutter arrays ensures safe driving. Further, during nighttime driving, wearing glasses provided with optical shutter arrays, for example, prevents the headlights of an oncoming vehicle from glaring on the eyes and allows early detection of pedestrians for safer driving.

Moreover, as shown in FIG. 11, the advantageous effect of the present invention can be achieved by providing an optical shutter capability to each lens itself.

In the above aspects, the method for detecting an optical phenomenon is not limited to specific ones. In an example of the detection method, a small camera 13 is attached to glasses or sunglasses. The position of a light source that glares on the eyes is identified by using the small camera to capture an image, and the resultant position is used to identify an optical shutter to be closed.

EXAMPLES

The present invention will be described below in more detail with reference to examples. The present invention, however, is not in any sense limited thereto.

Example 1

A device having a configuration shown in FIG. 12 was fabricated. That is, a lens 1 ("Canon EF lens 50 mm F1.8 II" manufactured by Canon Inc.) was first prepared. An image sensor 2 ("Canon EOS Kiss Digital X" manufactured by Canon Inc.) was disposed at the focal point of the lens. Five optical shutters were combined into a 2-mm-thick optical shutter array 3, which was then inserted as shown in FIG. 12. A protective cover 8 formed of a 2-mm-thick acrylic plate was disposed in the vicinity of the outer surface of the optical shutter array 3.

Water was then attached to the central portion of the protective cover 8 to form a water drop having a diameter of approximately 3 mm. The five optical shutters (optical shutters 31 to 35) were then sequentially opened to image a subject. FIGS. 13-1 to 13-5 show the results obtained by capturing images by sequentially opening the optical shutters 31 to 35. As shown in FIGS. 13-1 to 13-5, it has been ascertained that only the image captured by opening the optical shutter 33 (FIG. 13-3) obviously differs from the other images and the obstacle affects the light passing through the optical shutter 33.

FIG. 14 shows the result obtained by imaging the subject 4 through the four shutters except the optical shutter 33 that is closed. As a reference, FIG. 15 shows an image obtained by imaging the same subject through the five optical shutters with no water drop formed thereon. Comparing FIG. 14 with FIG. 15 indicates that the image captured by using the method of the present invention (FIG. 14) is totally free from the influence of the obstacle and of high quality.

Comparative Example 1

An image was captured in a manner similar to Example 1 except that the optical shutter 33 was not closed but the five optical shutters were used. FIG. 16 shows the result. It is shown that the image is degraded and the image quality is lower than that in Example 1.

Example 2

Images were captured in a manner similar to Example 1 except that the following method was used as the method for detecting an obstacle in Example 1.
(Obstacle Detecting Method)

A red light source was used as the light source 6, and the light source 6 was disposed, as shown in FIG. 17, in such a way that the distance "x" from the light source 6 to the center of the protective cover 8 was 6 cm and the line connecting the center of the protective cover 8 to the center of the image sensor 2 and the line connecting the center of the protective cover 8 to the light source form an angle θ of 30 degrees. FIGS. 18-1 and 18-2 show the results obtained by imaging reflected light of irradiated light using the image sensor 2 ("Canon EOS Kiss Digital X" manufactured by Canon Inc.). FIG. 18-1 shows an image captured with no obstacle provided, and FIG. 18-2 shows an image captured with an obstacle (water drop) attached. As shown in FIGS. 18-1 and 18-2, the obstacle emerged in red when irradiated with the light and the position of the obstacle was identified.

Example 3

Images were captured in a manner similar to Example 1 except that imaging was conducted under the condition that the imaging device was irradiated with intense light from two locations instead of having water attached to the central portion of the protective cover 8 in Example 1. FIGS. 19-1 and 19-2 show the results. FIG. 19-1 shows an image captured by opening all the five optical shutters, and FIG. 19-2 shows an image captured by closing, among the five optical shutters, two optical shutters through which light affected by the optical phenomenon passed. Comparing with FIG. 19-1 and FIG. 19-2 shows that although the brightness as a whole is lower because the amount of light is low, the influence of the image-quality-degrading optical phenomenon can be avoided.

According to the method of the present invention, in an image affected by an obstacle attached to a lens or a protective cover for the lens in an imaging device or an optical phenomenon produced by the lens or the protective cover for the lens in the imaging device, the imaging method and image processing can be used to avoid the obstacle or the optical phenomenon without removing the obstacle or optical phenomenon itself, and hence a high-quality image can be obtained. Since the method can be readily implemented even when the space for implementing the method is small and driving power consumed in the method is small, the method is applicable to consumer cameras currently in use. Further, the method is preferably used with cameras installed at locations where cleaning of the lens and the protective cover is difficult, such as those installed in artificial satellites, nuclear power plants, and high-altitude locations. Moreover, the method is preferably applicable not only to surveillance cameras and broadcasting cameras but also to on-board cameras for automobiles, vessels, airplanes, and other vehicles.

What is claimed is:

1. An imaging device for avoiding an obstacle or an image-quality-degrading optical phenomenon comprising: an optical shutter array, a lens, an imaging element and a protective cover, wherein the imaging device detects the obstacle or the optical phenomenon, and closes the optical shutter that corresponds to the portion affected by the obstacle or the image-quality-degrading optical phenomenon.

2. The imaging device for avoiding an obstacle or an image-quality-degrading optical phenomenon according to claim 1, wherein
an obstacle attached to the lens or the protective cover or an image-quality-degrading optical phenomenon that occurs at the lens or the protective cover is detected.

3. The imaging device for avoiding an obstacle or an image-quality-degrading optical phenomenon according to claim 2, wherein the detection of the obstacle or the optical phenomenon is carried out by sequentially opening the optical shutters in the optical shutter array to capture images and comparing the resultant multiple images with one another.

4. The imaging device for avoiding an obstacle or an image-quality-degrading optical phenomenon according to claim 2, wherein the lens or the protective cover is irradiated with light, and
the resultant reflected light is used to detect the obstacle or the image-quality-degrading optical phenomenon.

* * * * *